United States Patent

Miyakawa et al.

[11] Patent Number: 5,876,632
[45] Date of Patent: Mar. 2, 1999

[54] ELECTROCONDUCTIVE RESIN COMPOSITION, SHEET, MOLDED PRODUCT AND CONTAINER

[75] Inventors: Takeshi Miyakawa; Mikio Shimizu, both of Machida, Japan

[73] Assignee: Denki Kagaku Kogyo Kabushiki Kaisha, Tokyo, Japan

[21] Appl. No.: 917,606

[22] Filed: Aug. 26, 1997

Related U.S. Application Data

[63] Continuation of Ser. No. 834,297, Apr. 15, 1997, Pat. No. 5,707,699, which is a continuation of Ser. No. 578,480, Dec. 26, 1995, abandoned.

[30] Foreign Application Priority Data

| Jan. 26, 1995 | [JP] | Japan | 7-10685 |
| Jan. 26, 1995 | [JP] | Japan | 7-10686 |
| Apr. 12, 1995 | [JP] | Japan | 7-87000 |

[51] Int. Cl.$^6$ ............................... H01B 1/24; C08K 3/04
[52] U.S. Cl. .................... 252/511; 524/495; 524/496; 428/35.7
[58] Field of Search ................. 524/495, 496; 252/511; 428/35.7

[56] References Cited

U.S. PATENT DOCUMENTS

| 5,395,890 | 3/1995 | Nakano et al. | 525/165 |
| 5,484,838 | 1/1996 | Helms et al. | 524/496 |
| 5,688,317 | 11/1997 | Mackay et al. | 524/495 |
| 5,705,555 | 1/1998 | Guilfoy et al. | 524/495 |

*Primary Examiner*—Tae Yoon
*Attorney, Agent, or Firm*—Oblon, Spivak, McClelland, Maier & Neustadt, P.C.

[57] ABSTRACT

An electroconductive resin composition comprising (A) at least one thermoplastic resin selected from the group consisting of a polyphenylene ether type resin, a polystyrene type resin and an ABS type resin, (B) carbon black, and (C) an olefin type resin, said electroconductive resin composition containing from 5 to 50 parts by weight of (B) the carbon black per 100 parts by weight of (A) the thermoplastic resin, and from 1 to 30 parts by weight of (C) the olefin type resin per 100 parts by weight of the total amount of (A) the thermoplastic resin and (B) the carbon black, and said electroconductive resin composition having a surface resistivity of from $10^2$ to $10^{10}$ Ω.

11 Claims, No Drawings

ELECTROCONDUCTIVE RESIN COMPOSITION, SHEET, MOLDED PRODUCT AND CONTAINER

This is a continuation of application Ser. No. 08/834,297 filed on Apr. 15, 1997, now U.S. Pat. No. 5,707,699 which is a continuation of Ser. No. 08/578,480 filed Dec. 26, 1995, now abandoned.

BACKGROUND OF THE INVENTION

1. Field of the Invention

The present invention relates to an electroconductive resin composition, sheet, molded product and container. More particularly, it relates to an electroconductive resin composition having an olefin type resin incorporated to an electroconductive rein composition comprising carbon black and at least one thermoplastic resin selected from the group consisting of a polyphenylene ether type resin, a polystyrene type resin and an ABS type resin, so that staining of e.g. IC caused by falling off of e.g. carbon black by abrasion at the time of contact with e.g. IC is substantially reduced, and an electroconductive sheet, molded product and container made thereof.

2. Discussion of Background

As packaging containers for IC or electronic parts using IC, injection-molded trays, vacuum-formed trays, magazines, embossed carrier tapes, etc. have been used. To prevent breakage of IC, etc. due to static electricity, these packaging containers have been treated by, e.g., (1) a method of coating an antistatic agent on the surface of the packaging containers, (2) a method of coating an electroconductive paint, (3) a method of dispersing an antistatic agent, or (4) a method of dispersing an electroconductive filler.

Method (1) provides a sufficient antistatic effect immediately after the coating. However, during the use for an extended period of time, the antistatic agent tends to flow out due to moisture or tends to be lost by abrasion, whereby a constant performance can not be obtained. Further, the surface resistivity is at a level of from $10^9$ to $10^{12}\Omega$, which is not satisfactory for packaging IC, where a high level of an antistatic effect is required.

Method (2) has a drawback that during the preparation, coating tends to be non-uniform, and the coated paint is likely to fall off by abrasion, whereby the antistatic effect will be lost, thus leading to breakage of IC, and the lead of IC tends to be stained.

Method (3) has a demerit in that it is necessary to incorporate a large amount of an antistatic agent, whereby the physical properties of the resin will deteriorate, and the surface resistivity will be substantially affected by humidity, whereby a constant performance can hardly be obtained.

In method (4), the electroconductive filler may, for example, be fine metal powder, carbon fiber or carbon black. With fine metal powder and carbon fiber among them, adequate electroconductivity can be obtained with a small amount of incorporation, but the moldability will thereby substantially deteriorate, and it is difficult to uniformly disperse them. Further, a skin layer composed solely of the resin component is likely to form on the surface of a molded product, and it is difficult to obtain a constant surface resistivity.

Whereas, carbon black can be uniformly dispersed by properly selecting the kneading conditions, etc., whereby a constant surface resistivity can easily be obtained. For this reason, carbon black is most commonly employed. However, carbon black is required to be incorporated in a large amount, whereby the fluidity or the moldability tends to deteriorate.

As resins for dispersing carbon black therein, a polyvinyl chloride type resin, a polypropylene type resin, a polyethylene terephthalate type resin, a polystyrene type resin and an ABS type resin have been used as resins of general use, and a polyphenylene ether type resin and a polycarbonate resin have been used as heat resistant resins for use at a temperature of 100° C. or higher. Among these resins, a polystyrene type resin and an ABS type resin as resins of generally use, and a polyphenylene ether type resin as a heat resistant resin, are superior to other resins in that no substantial deterioration in the fluidity or moldability is observed even when carbon black is incorporated therein in a large amount, and they are also excellent from the viewpoint of costs. However, compositions obtained by adding a large amount of carbon black to these resins, have had a drawback that carbon black is likely to fall off from the surface of their molded products by abrasion.

SUMMARY OF THE INVENTION

It is an object of the present invention to overcome such drawbacks and to provide an electroconductive resin composition, sheet, molded product and container, whereby staining of e.g. IC caused by falling off of e.g. carbon black due to the contact and abrasion with e.g. IC is substantially reduced, by incorporating an olefin type resin to an electroconductive resin composition comprising carbon black and at least one thermoplastic resin selected from the group consisting of a polyphenylene ether type resin, a polystyrene type resin and an ABS type resin.

That is, in a first aspect, the present invention provides an electroconductive resin composition comprising (A) at least one thermoplastic resin selected from the group consisting of a polyphenylene ether type resin, a polystyrene type resin and an ABS type resin, (B) carbon black, and (C) an olefin type resin, said electroconductive resin composition containing from 5 to 50 parts by weight of (B) the carbon black per 100 parts by weight of (A) the thermoplastic resin, and from 1 to 30 parts by weight of (C) the olefin type resin per 100 parts by weight of the total amount of (A) the thermoplastic resin and (B) the carbon black, and said electroconductive resin composition having a surface resistivity of from $10^2$ to $10^{10}\Omega$.

In a second aspect, the present invention provides an electroconductive resin composition comprising (A) at least one thermoplastic resin selected from the group consisting of a polyphenylene ether type resin, a polystyrene type resin and an ABS type resin, (B) carbon black, (C) an olefin type resin, and (D) at least one block copolymer prepared from styrene and a conjugated diene, said electroconductive resin composition containing from 5 to 50 parts by weight of (B) the carbon black per 100 parts by weight of (A) the thermoplastic resin, and from 1 to 30 parts by weight of (C) the olefin type resin and from 0.2 to 10 parts by weight, in total, of (D) the block copolymer prepared from styrene and a conjugated diene, per 100 parts by weight of the total amount of (A) the thermoplastic resin and (B) the carbon black, and said electroconductive resin composition having a surface resistivity of from $10^2$ to $10^{10}\Omega$.

In a third aspect, the present invention provides an electroconductive resin composition comprising (A) at least one thermoplastic resin selected from the group consisting of a polyphenylene ether type resin, a polystyrene type resin and an ABS type resin, (B) carbon black, (C) an olefin type resin, and (E) a resin obtained by hydrogenation of a block copolymer prepared from styrene and a conjugated diene and/or a resin obtained by graft polymerization of styrene to a polyolefin, said electroconductive resin composition containing from 5 to 50 parts by weight of (B) the carbon black per 100 parts by weight of (A) the thermoplastic resin, and from 1 to 30 parts by weight of (C) the olefin type resin and from 1 to 30 parts by weight, in total, of (E) the resin obtained by hydrogenation of a block copolymer prepared from styrene and a conjugated diene and/or the resin obtained by graft polymerization of styrene to a polyolefin, per 100 parts by weight of the total amount of (A) the thermoplastic resin and (B) the carbon black, and said electroconductive resin composition having a surface resistivity of from $10^2$ to $10^{10}\Omega$.

DETAILED DESCRIPTION OF THE PREFERRED EMBODIMENTS

Now, the present invention will be described in detail with reference to the preferred embodiments.

In the present invention, (A) at least one thermoplastic resin selected from the group consisting of a polyphenylene ether type resin, a polystyrene type resin and an ABS type resin, is used. Here, the polyphenylene ether type resin is a resin comprising a polyphenylene ether resin and a polystyrene type resin as the main components. The content of the polyphenylene ether resin in 100 parts by weight of the total amount of the polyphenylene ether resin and the polystyrene type resin, is preferably from 28 to 86 parts by weight. If the content is less than 28 parts by weight, no adequate dynamical properties as the polyphenylene ether type resin tend to be obtained, and if it exceeds 86 parts by weight, the fluidity tends to be low, whereby molding tends to be difficult. Such a polyphenylene ether resin may, for example, be a homopolymer or a copolymer disclosed in U.S. Pat. No. 3,383,435.

The polystyrene type resin to be used in the present invention is the one composed mainly of a common polystyrene resin, an impact-resistant polystyrene resin, or a mixture thereof.

The ABS type resin is the one composed mainly of a copolymer consisting essentially of three components of acrylonitrile/butadiene/styrene.

(B) carbon black to be used in the present invention may, for example, be furnace black, channel black or acetylene black and preferably the one having a large specific surface area and whereby a high level of electroconductivity can be obtained with a small amount of incorporation to the resin. For example, it may be S.C.F. (Super Conductive Furnace), E.C.F. (Electric Conductive Furnace), KETJENBLACK (tradename, manufactured by LION-AKZO) or acetylene black. The amount of carbon black to be incorporated is an amount whereby the surface resistivity of the resulting resin composition, sheet, molded product and container will be from $10^2$ to $10^{10}\Omega$. The amount of (B) carbon black is preferably from 5 to 50 parts by weight per 100 parts by weight of (A) the thermoplastic resin. If the amount is less than 5 parts by weight, no adequate electroconductivity can be obtained, and the surface resistivity will increase. On the other hand, if it exceeds 50 parts by weight, uniform dispersion into the resin tends to be difficult, the moldability tends to substantially deteriorate, and the properties such as mechanical strength tend to deteriorate. Further, if the surface resistivity exceeds $10^{10}\Omega$, no adequate antistatic effect can be obtained, and if it is less than $10^2\Omega$, the power generating ability tends to be so good that IC will thereby be destroyed.

(C) the olefin type resin to be used in the present invention may, for example, be a homopolymer of ethylene or propylene, a copolymer composed mainly of ethylene or propylene, or a blend product thereof.

In the present invention, among these resins, it is preferred to employ a polyethylene type resin represented by a low density polyethylene resin, a high density polyethylene resin or a linear low density polyethylene resin, or an ethylene/α-olefin copolymer resin.

Further, in a case where (D) a block copolymer prepared from styrene and a conjugated diene, or (E) a resin obtained by hydrogenation of a block copolymer prepared from styrene and a conjugated diene and/or a resin obtained by graft polymerization of styrene to a polyolefin, is used in combination with (C) the olefin type resin, it is particularly preferred to use a polyethylene type resin.

The melt flow index of (C) the olefin type resin to be used in the present invention is at least 0.1 g/10 min as measured at 190° C. under a load of 2.16 kg (in accordance with JIS K-7210). If it is less than this numerical value, kneading with the polyphenylene ether type resin, the polystyrene type resin or the ABS type resin tends to be difficult, and it will be difficult to obtain a satisfactory composition. The amount of (C) the olefin type resin is preferably from 1 to 30 parts by weight, more preferably from 3 to 25 parts by weight, per 100 parts by weight of the total amount of (A) the thermoplastic resin and (B) the carbon black. If the amount is less than 1 part by weight, its effects tend to be inadequate, and if it exceeds 30 parts by weight, it tends to be difficult to uniformly disperse it into the polyphenylene ether type resin, the polystyrene type resin or the ABS type resin.

The ethylene/α-olefin copolymer resin to be used in the present invention is a resin prepared by copolymerizing ethylene with an α-olefin. The α-olefin copolymerized with ethylene may, for example, be propylene, butene-1, pentene-1 or hexene-1, specifically "TAFMER P" or "TAFMER A", manufactured by Mitsui Petrochemical Co., Ltd. The ethylene/α-olefin copolymer resin is preferably the one having a hardness of at most 90 as Durometer A type surface hardness stipulated in JIS K-7215.

In the present invention, (D) the block copolymer prepared from styrene and a conjugated diene is the one wherein the conjugated diene is butadiene or isoprene. Specifically, it is a block copolymer of styrene and butadiene, or a block copolymer of styrene and isoprene. Specifically, such a block copolymer may, for example, be a branched star block copolymer as disclosed in U.S. Pat. No. 3,281,383 or a linear block copolymer having at least three blocks, as represented by e.g. (S1)-(Bu)-(S2) wherein each of S1 and S2 is a block formed by styrene, and Bu is a block formed by butadiene or isoprene.

Further, when at least two different block copolymers are incorporated into the electroconductive resin composition in the present invention, it is preferred that at least one of them is (D1) a star block copolymer having a styrene content of from 50 to 90 wt %, and at least one of other block copolymers is (D2) a star or linear block copolymer having a styrene content of from 10 to 50 wt %. In many cases, this branched chain star block copolymer contains a straight chain block copolymer from the nature of the process for its production, but it is unnecessary to remove such a straight chain block copolymer, and their mixture may be employed as it is.

Further, the block copolymer prepared from styrene and a conjugated diene, to be used in the present invention, may selectively or partially be hydrogenated, and a part of double bonds in the blocks made of an isoprene monomer may be hydrogenated.

The amount of (D) the block copolymer prepared from styrene and a conjugated diene is preferably from 0.2 to 10 parts by weight, in total, per 100 parts by weight of the total amount of (A) the thermoplastic resin and (B) the carbon black. If the amount is less than 0.2 part by weight, its effects tend to be inadequate, and if it exceeds 10 parts by weight, it tends to be difficult to disperse it uniformly into the polyphenylene ether type resin, the polystyrene type resin or the ABS type resin.

In the present invention, as a resin composition comprising (C) the olefin type resin and (D) the block copolymer prepared from styrene and a conjugated diene, it is possible to employ an alloy resin having the block copolymer previously kneaded together with a styrene type resin and the olefin type resin. As a typical example, the resin composition disclosed in Japanese Unexamined Patent Publication No. 311009/1993 may be employed.

Component (E) to be used in the present invention is a resin obtained by hydrogenation of a block copolymer prepared from styrene and a conjugated diene and/or a resin obtained by graft polymerization of styrene to a polyolefin. The conjugated diene of the styrene/conjugated diene block copolymer to be used for the preparation of the resin obtained by hydrogenation of a block copolymer prepared from styrene and a conjugated diene, is preferably butadiene or isoprene, and the styrene content in the styrene/conjugated diene block copolymer is not particularly limited, but is usually from 10 to 80 wt %, preferably from 10 to 50 wt %. On the other hand, the polyolefin used for the resin obtained by graft polymerization of styrene to a polyolefin, is preferably polyethylene, polypropylene or an ethylene/vinyl acetate copolymer.

The amount of (E) a resin obtained by hydrogenation of a block copolymer prepared from styrene and a conjugated diene and/or a resin obtained by graft polymerization of styrene to a polyolefin, is preferably from 1 to 30 parts by weight, in total, per 100 parts by weight of the total amount of (A) the thermoplastic resin and (B) the carbon black. If the amount is less than 1 part by weight, its effects tend to be inadequate, and if it exceeds 30 parts by weight, it tends to be difficult to uniformly disperse it in the polyphenylene ether type resin, the polystyrene type resin or the ABS type resin.

In order for the electroconductive resin composition of the present invention to maintain the adequate moldability, when carbon black is incorporated so that the surface resistivity would be from $10^2$ to $10^{10} \Omega$, the melt flow index (as measured in accordance with JIS K-7210) is preferably at least 0.1 g/10 min, as measured at 230° C. under a load of 10 kg in the case of the polyphenylene ether type resin, at 200° C. under a load of 5 kg in the case of the polystyrene type resin, and at 220° C. under a load of 10 kg in the case of the ABS type resin.

Further, to the electroconductive resin composition of the present invention, it is possible to incorporate various additives such as a lubricant, a plasticizer, a processing assistant and a reinforcing agent, and other resin components, to improve the flow properties of the composition and the dynamic properties of the molded product.

To prepare the electroconductive resin composition of the present invention, it is possible to carry out kneading and pelletizing by means of conventional methods using e.g. a Banbury mixer, an extruder, etc. With respect to kneading of the electroconductive resin composition, the starting materials may be kneaded all at once. Otherwise, kneading may be stepwisely conducted by separately kneading, for example, a mixture of the styrene type resin and the carbon black, a mixture of the styrene type resin and the olefin type resin, and a mixture of the styrene type resin and the block copolymer, and finally putting such kneaded products together, followed by kneading.

The thickness of the entire sheet of the present invention is preferably from 0.1 to 3.0 mm. If the thickness is less than 0.1 mm, the strength of the packaging container obtainable by molding the sheet tends to be inadequate, and if it exceeds 3.0 mm, forming such as pressure forming, vacuum forming or thermoforming tends to be difficult.

Electroconductive plastic containers of the present invention are suitable for packaging IC. Specifically, they may, for example, be vacuum formed trays, magazines or embossed carrier tapes for packaging IC and vacuum formed trays for packaging electronic parts or electronic equipments using IC, and they may be obtained by processing the above-mentioned electroconductive plastic sheet by a conventional sheet-forming method such as pressure forming, vacuum forming or thermoforming.

Further, the injection molded electroconductive plastic product of the present invention can readily be obtained by subjecting the above-mentioned electroconductive resin composition to a conventional injection molding method.

Now, the present invention will be described in further detail with reference to Examples. However, it should be understood that the present invention is by no means restricted by such specific Examples.

EXAMPLES 1 to 12

Using the materials as identified in Table 1, the respective materials were weighed in the compositional ratios as identified in Table 2, uniformly mixed by high speed mixing, then kneaded by means of a ϕ45 mm vented twin-screw extruder and pelletized by a strand cut method to obtain a conductive resin composition. The obtained resin composition was extruded by means of a ϕ65 mm extruder (L/D=28) and a T-die having a width of 500 mm to obtain a sheet having an entire thickness of 300 μm.

Further, the obtained sheet was subjected to vacuum forming to obtain vacuum-formed trays and embossed carrier tapes for packaging IC of QFP 14 mm×20 mm/64 pin.

On the other hand, the obtained conductive resin composition was molded by an injection molding machine (100 t) to obtain a plate-like molded product having a thickness 1 mm and a size of 120 mm×120 mm and a molded product having a shape of a test sample for tensile properties.

The evaluation results of the composition, sheet, vacuum-formed tray, embossed carrier tape and injection-molded sample are shown in Table 4. In each Example, no falling of carbon black was observed.

COMPARATIVE EXAMPLES 1 to 6

In the same manner as in the Examples, using the materials as identified in Table 1, the respective materials were weighed in the compositional ratios as identified in Table 3, uniformly mixed by high speed mixing, then kneaded by means of a ϕ45 mm vented twin-screw extruder and pelletized by a strand cut method to obtain an electroconductive resin composition. Then, the obtained resin composition was extruded by means of a ϕ65 mm extruder (L/D=28) and a T-die with a width of 500 mm to obtain a sheet having an entire thickness of 300 μm.

Further, the obtained sheet was subjected to vacuum forming to obtain vacuum-formed trays and embossed carrier tapes for packaging IC of QFP 14 mm×20 mm/64 pin.

On the other hand, the obtained electroconductive resin composition was molded by an injection molding machine (100 t) to obtain a plate-like molded product having a thickness of 1 mm and a size of 120 mm×120 mm and a molded product having a shape of a test sample for tensile properties. The evaluation results of the composition, sheet, vacuum-formed tray, embossed carrier tape and injection-molded sample are shown in Table 4. In each Comparative Example, falling of carbon black was observed.

The respective evaluations were carried out by the following methods.

(1) Surface resistivity

Using a horestar surface resistivity meter (manufactured by Mitsubishi Petrochemical Co., Ltd.), the electrode distance was set to be 10 mm, and with respect to the sheet sample and the injection molded product, the resistivity was measured at optional ten points on the surface thereof, and with respect to the vacuum-formed tray and the embossed carrier tapes the resistivity was measured at 10 points at the center of the inner bottom surface of the pocket portion thereof, whereupon the respective logarithmic mean values were taken as the surface resistivity.

(2) Strength at break and tensile modulus

In accordance with JIS K-7113, with respect to the sheet sample, a No. 2 test specimen was measured, and with respect to the injection molded product, a No. 1 test specimen was measured, at a tensile speed of 10 mm/min.

(3) Presence or absence of falling of carbon black

With respect to the sheet sample and the injection molded product, IC of QFP 14 mm×20 mm/64 pin was pressed against the surface under a load of 100 g, and it was reciprocated 100 times at a stroke of 15 mm, whereupon the lead portion of IC was inspected by a microscope.

With respect to the vacuum-formed tray and the embossed carrier tape, the same IC was mounted in the pocket portion and vibrated at a speed of 400 reciprocations per minute with a stroke of 30 mm in a plane direction for 200,000 times, whereupon the lead portion of IC was inspected by a microscope. The evaluation was made based on whether or not black deposition of carbon black or the like on the lead portion was observed.

(4) MFI

With respect to the electroconductive resin compositions of the respective Examples and Comparative Examples, MFI was measured in accordance with JIS 7210.

TABLE 1

Materials

| Name | Grade | Manufacturers |
|---|---|---|
| Polyphenylene ether type resin | NORYL-731J | GE plastic |
| Impact-resistant polystyrene resin | HI-E4 | Denki Kagaku Kogyo K.K. |
| Transparent polystyrene resin | HRM-5 | Denki Kagaku Kogyo K.K. |
| ABS resin | SE-10 | Denki Kagaku Kogyo K.K. |
| Carbon black | Granular DENKA BLACK | Denki Kagaku Kogyo K.K. |
| Carbon black | KETJENBLACK | LION-AKZO |
| Carbon black | VULCAN-XC-72 | Cabolac |
| Linear low density polyethylene resin | ULTZEX 1520L | Mitsui Petrochemical Co. |
| Linear low density polyethylene resin | ULTZEX 2022L | Mitsui Petrochemical Co. |
| Linear low density polyethylene resin | ULTZEX 3520L | Mitsui Petrochemical Co. |
| High density polyethylene resin | HI-ZEX 5000S | Mitsui Petrochemical Co. |
| Low density polyethylene resin | MIRASON 102 | Mitsui Petrochemical Co. |
| Low density polyethylene resin | MIRASON 12 | Mitsui Petrochemical Co. |
| Ethylene-ethyl acrylate copolymer resin | NUC-6169 | Nippon Unicar |
| Ethylene/α-olefin copolymer resin | TAFMER P-0280 | Mitsui Petrochemical Co. |
| Ethylene/α-olefin copolymer resin | TAFMER A-4085 | Mitsui Petrochemical Co. |
| Linear styrene/butadiene block copolymer resin | STR-1602 | Denki Kagaku Kogyo K.K. |
| Star styrene/butadiene block copolymer resin | STYROLUX-684D | BASF |
| Star styrene/butadiene block copolymer resin | K-RESIN KR03 | Philips |
| Star styrene/butadiene block copolymer · polystyrene resin containing olefin type resin | STYROBLEND KR-2776 | BASF |
| Hydrogenated styrene/diene block copolymer resin | TUFTEC-H-1051 | Asahi Kasei K.K. |
| Ethylene/styrene graft copolymer resin | VMX-AN-50F | Mitsubishi Chemical Corporation |

TABLE 2

| | Materials | | Examples | | | | | | | | | | | |
|---|---|---|---|---|---|---|---|---|---|---|---|---|---|---|
| | Grade | | 1 | 2 | 3 | 4 | 5 | 6 | 7 | 8 | 9 | 10 | 11 | 12 |
| Compositional ratio | NORYL-731J | | 100 | 100 | 100 | 100 | | | | | | | | |
| | HI-E4 | | | | | | 100 | 100 | 70 | 70 | 70 | | | |
| | HRM-5 | | | | | | | | 30 | 30 | 30 | | | |
| | SE-10 | | | | | | | | | | | 100 | 100 | 100 |
| | Granular DENKA BLACK | | 26 | | 26 | | | 25 | | | | | 30 | |
| | KETJENBLACK | | | 12 | | | 12 | | | | | 12 | | |
| | VULCAN-XC-72 | | | | | 24 | | | 24 | 24 | 24 | | | 24 |
| | ULTZEX 1520L | | | | | | 6 | | | | | | | |
| | ULTZEX 2022L | | | | | | | 3 | | | | | | |
| | ULTZEX 3520L | | | | | | | | | | | 15 | | |
| | HI-ZEX 5000S | | | | 20 | | | 6 | | | | | | 15 |
| | MIRASON 102 | | 20 | | | | | | | | | | | |
| | MIRASON 12 | | | | | | | | 10 | | | | | |
| | NUC-6169 | | | | | 4 | 4 | 8 | | | | | | |
| | TAFMER P-0280 | | | | | 20 | | | | | | | | |
| | TAFMER A-4085 | | | | | | | | | 30 | | | 10 | |
| | STR-1602 | | | | | | 1 | 0.4 | | | | | | 3 |
| | STYROLUX-684D | | | | | | 2 | 0.4 | | | | | | |
| | K-RESIN KR03 | | | | | | | | | | | | | 3 |
| | STYROBLEND KR-2776 | | | | | | | | | | 40 | | | |
| | TUFTEC-H-1051 | | | | | | | 15 | | | | | | |
| | VMX-AN-50F | | | 5 | | | | | | | | | | |

TABLE 3

| | Materials | Comparative Examples | | | | | |
|---|---|---|---|---|---|---|---|
| | Grade | 1 | 2 | 3 | 4 | 5 | 6 |
| Compositional ratio | NORYL-731J | 100 | | | | | |
| | HI-E4 | | 100 | 100 | 70 | 70 | |
| | HRM-5 | | | | 30 | 30 | |
| | SE-10 | | | | | | 100 |
| | Granular DENKA BLACK | 26 | | | | | |
| | KETJENBLACK | | 12 | 12 | | | 12 |
| | VULCAN-XC-72 | | | | 24 | 22 | |
| | ULTZEX 1520L | | | | | | |
| | ULTZEX 2022L | | | | | 3 | |
| | ULTZEX 3520L | | | | | | |
| | HI-ZEX 5000S | | | | | | |
| | MIRASON 102 | | | | 45 | | |
| | MIRASON 12 | | | | | | |
| | NUC-6169 | | | | | | |
| | TAFMER P-0280 | | | | | 45 | 45 |
| | TAFMER A-4085 | | | | | | |
| | STR-1602 | | 0.4 | | | | |
| | STYROLUX-684D | | 0.4 | | | | |
| | K-RESIN KR03 | | | | | | |
| | STYROBLEND KR-2776 | | | | | | |
| | TUFTEC-H-1051 | | | | | | |
| | VMX-AN-50F | | | | | | |

TABLE 4

| | | Composition MFI (g/10 min) | Sheet sample | | | | Vacuum-formed tray | |
|---|---|---|---|---|---|---|---|---|
| | | | Surface resistivity ($\Omega$) | Strength at break (kgf/mm$^2$) | Tensile modulus (kgf/mm$^2$) | Falling off of carbon | Surface resistivity ($\Omega$) | Falling off of carbon |
| Examples | 1 | 2.5 | $1.3 \times 10^5$ | 4.1 | 149 | Nil | $2.0 \times 10^5$ | Nil |
| | 2 | 2.8 | $2.6 \times 10^4$ | 4.3 | 145 | Nil | $3.0 \times 10^4$ | Nil |
| | 3 | 3.0 | $1.3 \times 10^5$ | 4.1 | 149 | Nil | $2.6 \times 10^5$ | Nil |
| | 4 | 2.9 | $2.3 \times 10^5$ | 4.3 | 149 | Nil | $4.5 \times 10^5$ | Nil |
| | 5 | 3.0 | $8.0 \times 10^4$ | 1.9 | 130 | Nil | $1.2 \times 10^5$ | Nil |
| | 6 | 3.1 | $5.2 \times 10^4$ | 2.0 | 130 | Nil | $6.8 \times 10^4$ | Nil |
| | 7 | 3.3 | $4.8 \times 10^4$ | 2.5 | 125 | Nil | $1.0 \times 10^5$ | Nil |
| | 8 | 3.1 | $5.2 \times 10^4$ | 2.2 | 128 | Nil | $7.3 \times 10^4$ | Nil |

TABLE 4-continued

|   | | | | | | | |
|---|---|---|---|---|---|---|---|
| 9 | 3.0 | $1.1 \times 10^5$ | 2.1 | 130 | Nil | $9.1 \times 10^4$ | Nil |
| 10 | 2.8 | $7.4 \times 10^5$ | 2.7 | 133 | Nil | $9.2 \times 10^5$ | Nil |
| 11 | 2.8 | $7.0 \times 10^4$ | 2.7 | 133 | Nil | $4.3 \times 10^4$ | Nil |
| 12 | 2.4 | $9.7 \times 10^4$ | 2.3 | 134 | Nil | $2.1 \times 10^6$ | Nil |

| | | Embossed carrier tape | | Injection-molded sample | | | |
|---|---|---|---|---|---|---|---|
| | | Surface resistivity ($\Omega$) | Falling off of carbon | Surface resistivity ($\Omega$) | Strength at break (kgf/mm$^2$) | Tensile modulus (kgf/mm$^2$) | Falling off of carbon |
| Examples | 1 | $1.9 \times 10^5$ | Nil | $2.3 \times 10^6$ | 4.3 | 150 | Nil |
| | 2 | $3.2 \times 10^4$ | Nil | $4.2 \times 10^5$ | 4.4 | 149 | Nil |
| | 3 | $3.2 \times 10^5$ | Nil | $2.3 \times 10^6$ | 4.3 | 150 | Nil |
| | 4 | $4.0 \times 10^5$ | Nil | $9.7 \times 10^5$ | 4.3 | 149 | Nil |
| | 5 | $5.1 \times 10^5$ | Nil | $8.0 \times 10^4$ | 1.9 | 130 | Nil |
| | 6 | $6.5 \times 10^4$ | Nil | $9.0 \times 10^4$ | 1.8 | 129 | Nil |
| | 7 | $2.1 \times 10^5$ | Nil | $7.3 \times 10^4$ | 2.3 | 125 | Nil |
| | 8 | $6.9 \times 10^4$ | Nil | $9.0 \times 10^4$ | 2.3 | 129 | Nil |
| | 9 | $8.9 \times 10^4$ | Nil | $2.4 \times 10^5$ | 2.1 | 130 | Nil |
| | 10 | $8.8 \times 10^5$ | Nil | $1.1 \times 10^5$ | 2.9 | 132 | Nil |
| | 11 | $9.7 \times 10^4$ | Nil | $8.7 \times 10^4$ | 2.9 | 132 | Nil |
| | 12 | $2.9 \times 10^5$ | Nil | $1.5 \times 10^5$ | 2.3 | 134 | Nil |

| | | Sheet sample | | | | Vacuum-formed tray | |
|---|---|---|---|---|---|---|---|
| | | Composition MFI (g/10 min) | Surface resistivity ($\Omega$) | Strength at break (kgf/mm$^2$) | Tensile modulus (kgf/mm$^2$) | Falling off of carbon | Surface resistivity ($\Omega$) | Falling off of carbon |
| Comparative Examples | 1 | 1.9 | $7.6 \times 10^4$ | 4.2 | 151 | Observed | $8.6 \times 10^4$ | Observed |
| | 2 | 2.2 | $1.7 \times 10^4$ | 2.2 | 130 | Observed | $4.7 \times 10^4$ | Observed |
| | 3 | 2.9 | $3.0 \times 10^4$ | 2.1 | 132 | Observed | $4.0 \times 10^4$ | Observed |
| | 4 | 5.1 | $5.9 \times 10^4$ | 1.9 | 113 | Observed | $8.0 \times 10^4$ | Observed |
| | 5 | 4.0 | $7.8 \times 10^4$ | 1.9 | 123 | Observed | $8.2 \times 10^4$ | Observed |
| | 6 | 3.0 | $5.3 \times 10^5$ | 2.6 | 134 | Observed | $6.9 \times 10^5$ | Observed |

| | | Embossed carrier tape | | Injection-molded sample | | | |
|---|---|---|---|---|---|---|---|
| | | Surface resistivity ($\Omega$) | Falling off of carbon | Surface resistivity ($\Omega$) | Strength at break (kgf/mm$^2$) | Tensile modulus (kgf/mm$^2$) | Falling off of carbon |
| Comparative Examples | 1 | $8.0 \times 10^4$ | Observed | $8.9 \times 10^5$ | 4.3 | 150 | Observed |
| | 2 | $5.1 \times 10^4$ | Observed | $1.9 \times 10^5$ | 2.3 | 132 | Observed |
| | 3 | $4.9 \times 10^4$ | Observed | $6.7 \times 10^5$ | 2.0 | 133 | Observed |
| | 4 | $8.5 \times 10^4$ | Observed | $5.9 \times 10^5$ | 1.9 | 110 | Observed |
| | 5 | $9.0 \times 10^4$ | Observed | $5.7 \times 10^5$ | 1.9 | 123 | Observed |
| | 6 | $6.5 \times 10^5$ | Observed | $1.6 \times 10^5$ | 2.7 | 133 | Observed |

As described in the foregoing, by incorporating an olefin type resin to an electroconductive resin composition comprising carbon black and at least one thermoplastic resin selected from the group consisting of a polyphenylene ether type resin, a polystyrene type resin and an ABS type resin, it is possible to obtain an electroconductive resin composition, sheet, molded product and container, whereby staining of e.g. IC caused by falling off of carbon black due to abrasion at the time of contact with e.g. IC can be substantially reduced.

What is claimed is:

1. An electroconductive resin composition consisting essentially of
   (A) a high impact polystyrene resin, or a mixture of a polystyrene resin and a high impact polystyrene resin,
   (B) carbon black,
   (C) an olefin resin, and
   (D) at least one block copolymer prepared from styrene and a conjugated diene,
   said electroconductive resin composition containing from 5 to 50 parts by weight of (B) the carbon black per 100 parts by weight of (A),
   and from 1 to 30 parts by weight of (C) the olefin resin and from 0.2 to 10 parts by weight, of (D) the block copolymer prepared from styrene and a conjugated diene, per 100 parts by weight of the total amounts of (A) and (B) the carbon black,
   and said electroconductive resin composition having a surface resistivity of from $10^2$ to $10^{10}\Omega$ and a melt flow index of at least 0.1 g/10 min at 200° C. under a load of 5 kg.

2. An electroconductive resin composition, consisting essentially of
   (A) a high impact polystyrene resin, or a mixture of a polystyrene resin and a high impact polystyrene resin,
   (B) carbon black,
   (C) an olefin resin, and
   (E) a resin obtained by hydrogenation of a block copolymer prepared from styrene and a conjugated diene and/or a resin obtained by graft polymerization of styrene to a polyolefin,
   said electroconductive resin composition containing from 5 to 50 parts by weight of (B) the carbon black per 100 parts by weight of (A), and from 1 to 30 parts by weight of (C) the olefin resin and from 1 to 30 parts by weight, of (E) the resin obtained by hydrogenation of a block copolymerization prepared from styrene and a conjugated diene and/or the resin obtained by graft polymerization of styrene to a polyolefin, per 100 parts by weight of the total amount of (A) and (B) the carbon black, and said electroconductive resin composition having a surface resistivity of from $10^2$ to $10^{10} \Omega$ and a melt flow index of at least 0.1 g/10 min at 200° C. under a load of 5 kg.

3. The electroconductive resin composition according to claim 1, wherein (C) the olefin resin is a polyethylene resin.

4. The electroconductive resin composition according to claim 2, wherein (C) the olefin resin is a polyethylene resin.

5. An electroconductive resin composition consisting essentially of (A) a polystyrene resin, a high impact polystyrene resin, or a mixture thereof, (B) carbon black, (C) an olefin resin, and (D) at least two block copolymers prepared from styrene and a conjugated diene, wherein at least one of them is (D1) a star block copolymer having a styrene content of from 50 to 90 wt %, and at least one of other block copolymers is (D2) a star of linear block copolymer having a styrene content of from 10 to 50 wt %, said electroconductive resin composition containing from 5 to 50 parts by weight of (B) the carbon black per 100 parts by weight of (A), and from 1 to 30 parts by weight of (C) the olefin resin and from 0.2 to 10 parts by weight, of (D) the block copolymers prepared from styrene and a conjugated diene, per 100 parts by weight of the total amounts of (A) and (B) the carbon black, and said electroconductive resin composition having a surface resistivity of from $10^2$ to $10^{10} \Omega$ and a melt flow index of at least 0.1 g/10 min at 200° C. under a load of 5 kg.

6. An electroconductive resin sheet made of the resin composition as defined in claim 1.

7. An electroconductive resin sheet made of the resin composition as defined in claim 2.

8. An injection molded product made of the resin composition as defined in claim 1.

9. An injection molded product made of the resin composition as defined in claim 2.

10. An electroconductive container obtained by thermoforming the electroconductive resin sheet as defined in claim 1.

11. An electroconductive container obtained by thermoforming the electroconductive resin sheet as defined in claim 2.

* * * * *